United States Patent
Orimo et al.

(10) Patent No.: US 10,622,129 B2
(45) Date of Patent: Apr. 14, 2020

(54) MAGNETIC MATERIAL AND ELECTRONIC COMPONENT

(71) Applicant: TAIYO YUDEN CO., LTD., Taito-ku, Tokyo (JP)

(72) Inventors: Yoko Orimo, Takasaki (JP); Xinyu Li, Takasaki (JP); Shinsuke Takeoka, Takasaki (JP); Chengli He, Takasaki (JP); Kenji Otake, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 280 days.

(21) Appl. No.: 15/638,100

(22) Filed: Jun. 29, 2017

(65) Prior Publication Data

US 2018/0005739 A1 Jan. 4, 2018

(30) Foreign Application Priority Data

Jun. 30, 2016 (JP) .................................. 2016-129672
May 22, 2017 (JP) .................................. 2017-100746

(51) Int. Cl.
*H01F 1/34* (2006.01)
*C01G 37/02* (2006.01)
*C01B 33/12* (2006.01)
*C22C 38/02* (2006.01)
*C22C 38/18* (2006.01)
*H01F 10/26* (2006.01)

(52) U.S. Cl.
CPC ............ *H01F 1/342* (2013.01); *C01B 33/12* (2013.01); *C01G 37/02* (2013.01); *C22C 38/02* (2013.01); *C22C 38/18* (2013.01); *H01F 10/265* (2013.01)

(58) Field of Classification Search
CPC ........................................................ H01L 1/342
See application file for complete search history.

(56) References Cited

U.S. PATENT DOCUMENTS

| | | | | |
|---|---|---|---|---|
| 8,416,051 B2* | 4/2013 | Matsuura | ................ | H01F 27/24 336/233 |
| 8,427,265 B2* | 4/2013 | Hachiya | .............. | H01F 17/0013 336/83 |
| 8,896,405 B2* | 11/2014 | Hachiya | .................... | H01F 1/40 336/200 |
| 9,030,285 B2* | 5/2015 | Matsuura | ................ | H01F 27/24 336/200 |
| 9,287,026 B2* | 3/2016 | Matsuura | .................. | B22F 1/02 |

FOREIGN PATENT DOCUMENTS

JP 2015126047 A 7/2015
JP 2015144238 A 8/2015

* cited by examiner

*Primary Examiner* — C Melissa Koslow
(74) *Attorney, Agent, or Firm* — Law office of Katsuhiro Arai

(57) ABSTRACT

A magnetic material has: multiple soft magnetic alloy grains that contain Fe, element L (where element L is Si, Zr, or Ti), and element M (where element M is not Si, Zr, or Ti, and oxidizes more easily than Fe); a first oxide film that contains element L and covers each of the multiple soft magnetic alloy grains; a second oxide film that contains element M and covers the first oxide film; a third oxide film that contains element L and covers the second oxide film; a fourth oxide film that contains Fe and covers the third oxide film; and bonds that are constituted by parts of the fourth oxide film and that bond the multiple soft magnetic alloy grains together.

18 Claims, 7 Drawing Sheets

MAGNETIC MATERIAL AND ELECTRONIC COMPONENT

BACKGROUND

Field of the Invention

The present invention relates to a magnetic material primarily used for the magnetic cores of coils, inductors, etc., as well as an electronic component using said magnetic material.

Description of the Related Art

Inductors, choke coils, transistors, and other electronic components each have a magnetic body that constitutes a magnetic core, as well as a coil formed inside or on the surface of this magnetic body. For the materials of magnetic bodies, NiCuZu ferrite and other ferrite materials are generally used, for example.

In recent years, these types of electronic components are facing a need to support higher current, and to meet this demand, making their magnetic bodies from metal materials, instead of traditional ferrites, is being examined. Known metal materials include FeSiCr alloy, FeSiAl alloy, and the like, and, for example, Patent Literature 1 discloses a compacted powder magnetic core made from a FeSiCr soft magnetic alloy powder whose alloy phases are bonded together through oxide phases containing Fe, Si and Cr.

On the other hand, there is a need to further improve the electrical insulation characteristics of metal magnetic materials because, although the saturated magnetic flux densities of these materials are higher than those of ferrites, the volume resistivities of these materials are lower than those of conventional ferrites. For example, Patent Literature 2 discloses a magnetic core made of soft magnetic compacted powder, which is constituted by soft magnetic metal grains whose primary component is Fe, and glass parts disposed between the grains. The glass parts are formed by softening a glass material of low melting point using heat in a pressurized state. It is stated that, when a glass material of low melting point is heated, diffusion reaction occurs between the soft magnetic metal grains due to the low melting point of the material, and this makes it possible to fill voids of certain sizes that cannot be filled with the oxide parts covering the surfaces of the soft magnetic metal grains.

BACKGROUND ART LITERATURES

[Patent Literature 1] Japanese Patent Laid-open No. 2015-126047

[Patent Literature 2] Japanese Patent Laid-open No. 2015-144238

SUMMARY

However, filling the gaps between alloy grains with glass is difficult, and doing so presents a problem in terms of lack of insulation stability. Also, even if the gaps between alloy grains can be filled with glass, it may cause the oxidization reaction of the alloy grains to become unstable and the insulation characteristics may decrease.

In light of the aforementioned situations, an object of the present invention is to provide a magnetic material, and an electronic component, which can improve insulation characteristics.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, a magnetic material pertaining to an embodiment of the present invention has multiple magnetic alloy grains, a first oxide film, a second oxide film, a third oxide film, a fourth oxide film, and bonding parts.

The multiple magnetic alloy grains contain Fe, element L (where element L is Si, Zr, or Ti), and element M (where element M is not Si, Zr, or Ti, and oxidizes more easily than Fe).

The first oxide film contains element L, and covers each of the multiple soft magnetic alloy grains.

The second oxide film contains element M, and covers the first oxide film.

The third oxide film is amorphous in nature, contains element L, and covers the second oxide film.

The fourth oxide film contains Fe, and covers the third oxide film.

The bonding parts are constituted by parts of the fourth oxide film, and bond the multiple soft magnetic alloy grains together. In some embodiments, alternatively, the multiple soft magnetic alloy grains coated with the oxide films can be bonded together via resin without using the bonding parts by the fourth oxide film or other oxide film(s).

With the aforementioned magnetic material, the surfaces of the soft magnetic alloy grains are covered by the first to fourth oxide films, and this effectively increases the insulation characteristics between the soft magnetic alloy grains that are bonded via the bonding parts constituted by parts of the fourth oxide film.

Typically, element M is Cr, while element L is Si.

The third oxide film may have a thickness equal to or greater than the thickness of the first oxide film.

The thickness of the third oxide film is not limited in any way, and it is 1 nm or more but no more than 20 nm, for example.

A magnetic material pertaining to another embodiment of the present invention has multiple magnetic alloy grains, a first oxide film, a second oxide film, a third oxide film, and a fourth oxide film.

The multiple magnetic alloy grains contain Fe, element L (where element L is Si, Zr, or Ti), and element M (where element M is not Si, Zr, or Ti, and oxidizes more easily than Fe).

The first oxide film contains element L, and covers each of the multiple soft magnetic alloy grains.

The second oxide film contains element M, and covers the first oxide film.

The third oxide film is amorphous in nature, contains element L, and covers the second oxide film.

The fourth oxide film contains Fe, and covers the third oxide film.

An electronic component pertaining to an embodiment of the present invention has a magnetic core that contains the aforementioned magnetic material.

According to the present invention, the insulation characteristics can be improved.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
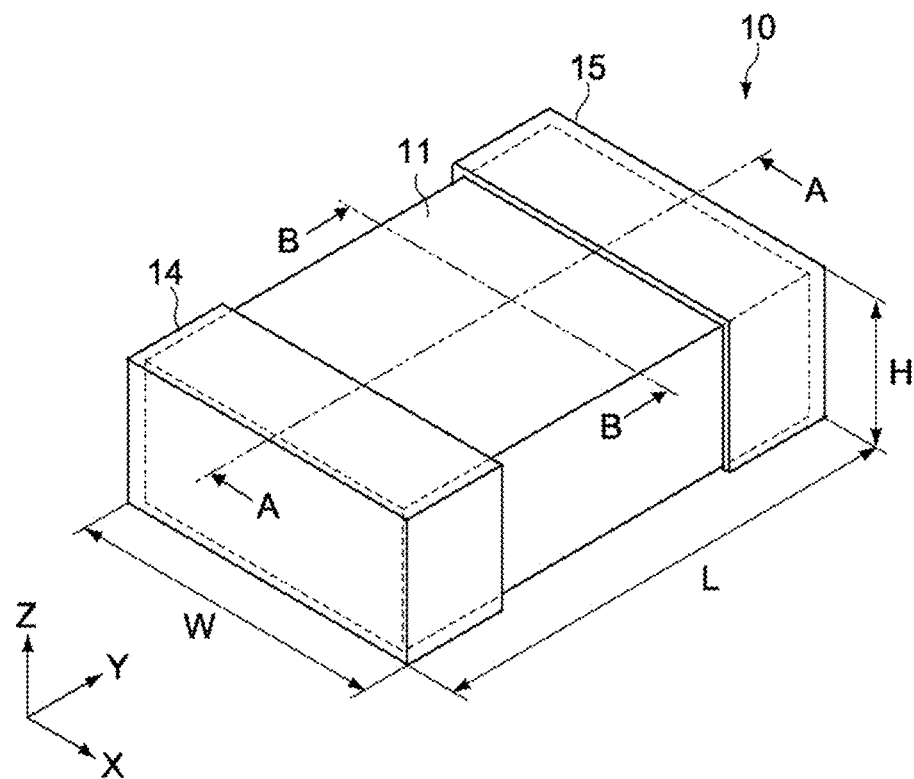
FIG. 1 is a general perspective view of a coil component pertaining to an embodiment of the present invention.

10—Coil component
11—Component body
12—Magnetic body part
13—Coil part
14, 15—External electrode
121—First magnetic layer
122—Second magnetic layer
123—Third magnetic layer
P1, P2—Soft magnetic alloy grain
F1, F2—Oxide
F21—First oxide film
F22—Second oxide film
F23—Third oxide film
F24—Fourth oxide film
V2—Bonding part

DETAILED DESCRIPTION OF EMBODIMENTS

Embodiments of the present invention are explained below by referring to the drawings.

Figure 2:
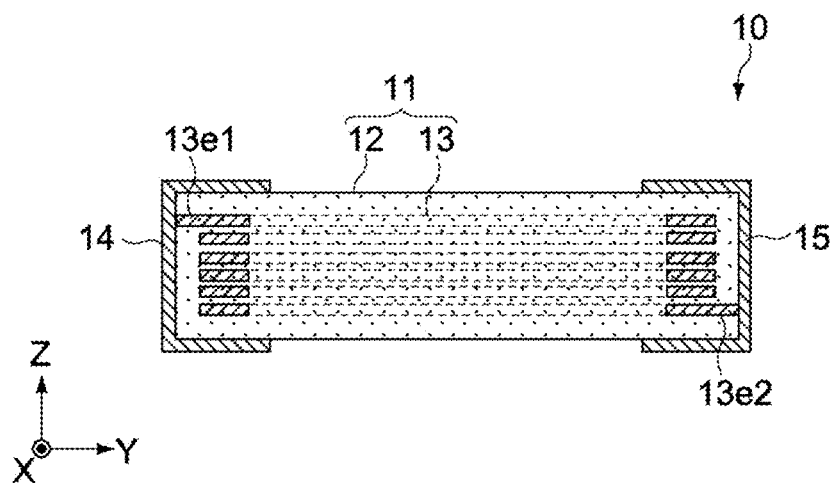
FIG. 2 is a cross-sectional view along line A-A in FIG. 1.

FIG. 1 is a general perspective view showing a coil component (multilayer inductor), being an electronic component pertaining to an embodiment of the present invention. FIG. 2 is a cross-sectional view along line A-A in FIG. 1.

[General Constitution of Coil Component]

The coil component 10 in this embodiment has a component body 11 and a pair of external electrodes 14, 15, as shown in FIG. 1. The component body 11 is formed as a rectangular solid shape of width W in the X-axis direction, length L in the Y-axis direction, and height H in the Z-axis direction. The pair of external electrodes 14, 15 are provided on the two opposing end faces of the component body 11 in the length direction (Y-axis direction).

The dimension of each part of the component body 11 is not limited in any way, and in this embodiment, the length L is 1.6 to 2 mm, width W is 0.8 to 1.2 mm, and height H is 0.4 to 0.6 mm.

The component body 11 has a magnetic body part 12 of rectangular solid shape, and a coil part 13 (internal conductor) of spiral shape covered with the magnetic body part 12, as shown in FIG. 2.

Figure 3:
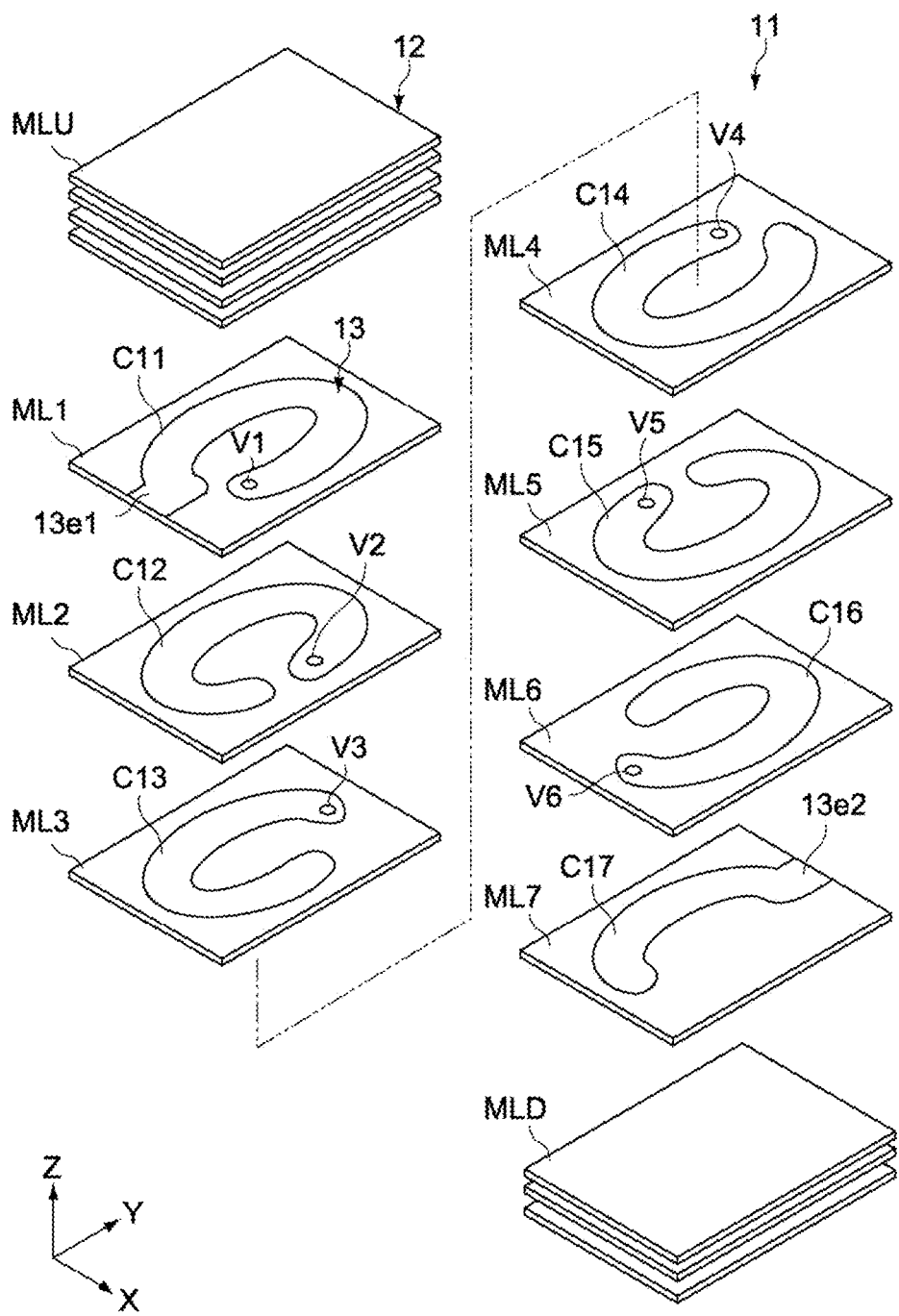
FIG. 3 is an exploded perspective view of the component body of the aforementioned multilayer inductor.
Figure 4:
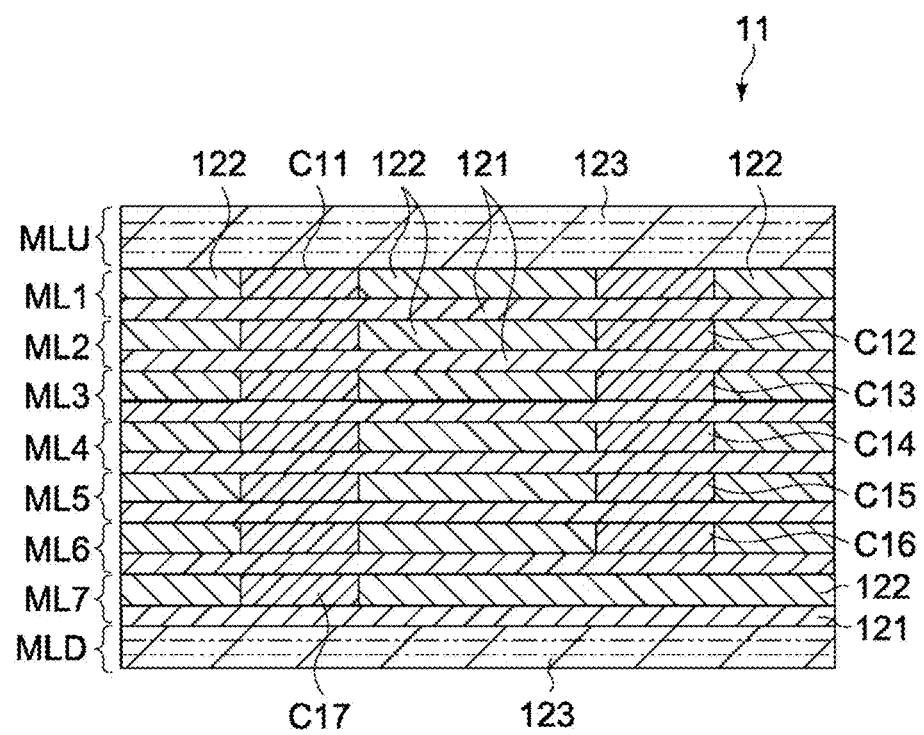
FIG. 4 is a cross-sectional view along line B-B in FIG. 1.

FIG. 3 is an exploded perspective view of the component body 11. FIG. 4 is a cross-sectional view along line B-B in FIG. 1.

The magnetic body part 12 has a structure where multiple magnetic body layers MLU, ML1 to ML7, and MLD, are stacked together in the height direction (Z-axis direction), as shown in FIG. 3. The magnetic body layers MLU, MLD constitute the top and bottom cover layers (third magnetic layers) of the magnetic body part 12, respectively. The magnetic body layers ML1 to ML7 constitute conductive layers that include the coil part 13, and as shown in FIG. 4, they each have a first magnetic layer 121, a second magnetic layer 122, and one of conductive patterns C11 to C17.

The first magnetic layer 121 is constituted as an interconductive layer disposed between an adjacent pair of conductive patterns C11 to C17 above and below it. For the first magnetic layer 121, soft magnetic alloy grains are used. For the soft magnetic alloy grains, FeSiCr magnetic alloy grains are used in this embodiment, for example. The composition of the soft magnetic alloy grain is typically 1 to 5 percent by weight of Cr and 2 to 10 percent by weight of Si, with Fe accounting for the remainder excluding impurities, for a total of 100 percent by weight.

The average grain size (median diameter) of soft magnetic alloy grains in terms of volume-based grain size can be set in any way as deemed appropriate, according to the target magnetic characteristics (specific magnetic permeability, inductance, saturated magnetization, etc.), thickness of the first magnetic layer 121, and so on. If the thickness of the first magnetic layer 121 is 4 μm or more but no more than 20 μm, for example, the average grain size of the soft magnetic alloy grains constituting the first magnetic layer 121 is such that four or more alloy grains can lie side by side within the thickness dimension in the thickness direction (Z-axis direction), or 1 μm or more but no more than 5 μm, for example.

For the soft magnetic alloy grains, FeZrCr, FeSiAl, FeSiTi, FeZrAl, FeZrTi, etc., may be used, in addition to FeSiCr. In other words, the soft magnetic alloy grains contain Fe as the primary component, at least one element selected from Si, Zr, and Ti (hereinafter also referred to as "element L"), and at least one element which is not Si, Zr, or Ti and which oxidizes more easily than Fe, such as Cr, Al, etc. (hereinafter also referred to as "element M"). By using such magnetic material, the below-mentioned oxide films are formed stably on the surfaces of the soft magnetic alloy grains, and high insulation property can be achieved, even when heat treatment is performed at low temperature.

It should be noted that, in the FeSiCr alloy, preferably the remainder of Si and Cr, excluding unavoidable impurities, is Fe. Metals that may be contained besides Fe, Si, and Cr include Al, Mg (magnesium), Ca (calcium), Ti, Mn (manganese), Co (cobalt), Ni (nickel), Cu (copper), and the like, while non-metals that can be contained include P (phosphorus), S (sulfur), C (carbon), and the like.

The conductive patterns C11 to C17 are placed on the first magnetic layers 121. As shown in FIGS. 3 and 4, the conductive patterns C11 to C17 constitute parts of a coil that winds around the Z-axis, and are electrically connected to each other in the Z-axis direction through vias V1 to V6, to form the coil part 13. The conductive pattern C11 on the magnetic body layer ML1 has a lead end 13e1 which is electrically connected to one external electrode 14, while the conductive pattern C17 on the magnetic body layer ML7 has a lead end 13e2 which is electrically connected to the other external electrode 15.

The second magnetic layer 122 is constituted by soft magnetic alloy grains of the same type as that of the soft magnetic alloy grains constituting the first magnetic layer 121 (FeCrSi alloy grains in this example). The second magnetic layers 122 are arranged in a manner facing each other in the Z-axis direction, with the first magnetic layers 121 in between, around (in the outer periphery area and inner periphery area of) the conductive patterns C11 to C17 on the first magnetic layers 121. The thickness of the second magnetic layer 122 at each of the magnetic body layers ML1 to ML7 in the Z-axis direction is typically the same as the thickness of each of the conductive patterns C11 to C17; however, these thicknesses may be different.

In this embodiment, the second magnetic layer 122 is constituted by a magnetic material whose resistance is higher than that of the first magnetic layer 121. This way, desired electrical insulation characteristics can be ensured in a stable manner between the conductive patterns C11 to C17 and the external electrodes 14, 15. The differences between the magnetic material constituting the first magnetic layer 121 and the magnetic material constituting the second magnetic layer 122 are described later.

The third magnetic layer 123 is constituted by soft magnetic alloy grains of the same type as that of the soft magnetic alloy grains constituting the first magnetic layer 121 (FeCrSi alloy grains in this example). The third magnetic layers 123 correspond to the top magnetic body layer MLU and bottom magnetic body layer MLD, respectively, and are arranged in a manner facing each other in the Z-axis direction, with the first magnetic layers 121, second magnetic layers 122, and conductive patterns C11 to C17 (coil part 13) in the magnetic body layers ML1 to ML7 placed in between. The magnetic body layers MLU, MLD are each constituted by a laminate of multiple third magnetic layers 123; however, the number of layers in such laminate is not limited in any way. Also, the first magnetic layer 121 in the magnetic body layer ML7 may be constituted by the third magnetic layer 123 positioned as the topmost layer in the magnetic body layer MLD. Also, the bottommost layer in the magnetic body layer MLU may be constituted by the first magnetic layer 121.

Next, the coil part 13 is constituted by a conductive material, and has a lead end 13e1 electrically connected to the external electrode 14, and a lead end 13e2 electrically connected to the external electrode 15. The coil part 13 is constituted by a sintered compact of conductive paste, and in this embodiment, it is constituted by a sintered compact of silver (Ag) paste.

The coil part 13 is spirally wound around the height direction (Z-axis direction) inside the magnetic body part 12. As shown in FIG. 3, the coil part 13 has seven conductive patterns C11 to C17 that are formed in the specified shapes on the magnetic body layers ML1 to ML7, respectively, as well as a total of six vias V1 to V6 that connect the conductive patterns C11 to C17 in the Z-axis direction, and these are spirally integrated to constitute the coil part. It should be noted that the conductive patterns C12 to C16 correspond to the winding parts of the coil part 13, while the conductive patterns C11, C17 correspond to the lead parts of the coil part 13. The coil part 13 shown in the figure is wound by approx. 5.5 times; however, it goes without saying that the number of windings is not limited thereto.

As shown in FIG. 3, the coil part 13 is formed as an oval shape whose long axis corresponds to the length direction of the magnetic body part 12 when viewed from the Z-axis direction. This way, the path of the current flowing through the coil part 13 can be made shortest, and thus the direct current resistance can be lowered. Here, "oval shape" typically means the shape of an oval or ellipse (shape constituted by two semi-circles connected with straight lines), rounded rectangle, or the like. It should be noted that the coil part 13 is not limited to these shapes, and may have a roughly rectangular shape when viewed from the Z-axis direction.

[Details of Magnetic Body Part]

Next, details of the magnetic body part 12 are explained.

Present on the surfaces of the soft magnetic alloy grains (FeCrSi alloy grains) constituting the first to third magnetic layers 121 to 123 are oxides of the FeCrSi alloy grains, as insulation films. The FeCrSi alloy grains in each of the magnetic layers 121 to 123 are bonded to each other via the oxides, while the FeCrSi alloy grains near the coil part 13 are contacting the coil part 13 via the oxides. The oxides typically contain one of $Fe_3O_4$ which is a magnetic body and $Fe_2O_3$, $Cr_2O_3$ and $SiO_2$ which are non-magnetic bodies.

(First Magnetic Layer)

Figures 5, 6:
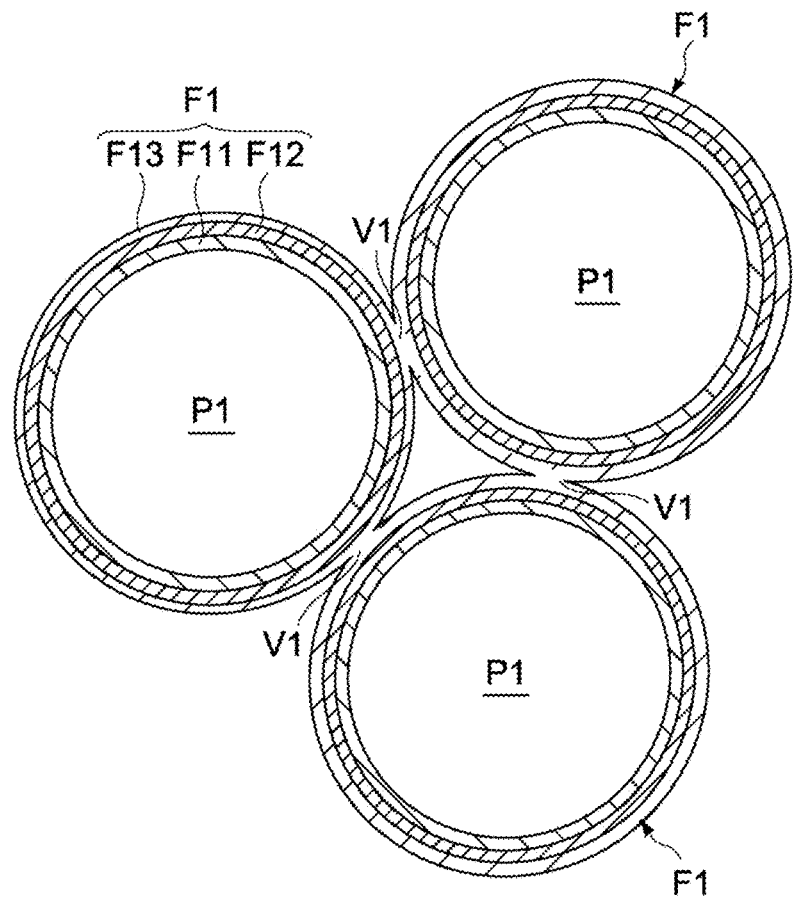
FIG. 5 is a cross-sectional view showing a schematic representation of the fine structure of the oxide films in the magnetic body constituting the first magnetic layer of the aforementioned coil component.
FIG. 6 is a cross-sectional view showing a schematic representation of the layer structure of the oxide films in the magnetic body constituting the aforementioned first magnetic layer.

FIG. 5 is an outline cross-sectional view of the first oxide F1 formed on the surfaces of the soft magnetic alloy grains P1 constituting the first magnetic layer 121, while FIG. 6 is a schematic view explaining the layer structure of this first oxide F1.

The first magnetic layer 121 as a whole is constituted by an assembly of many originally independent soft magnetic alloy grains P1 that are now bonded together, or by a compacted powder comprising many soft magnetic alloy grains P1. Depicted in FIG. 5 is an enlarged view of areas near the boundaries of three soft magnetic alloy grains P1.

The first oxide F1 is formed at least partially around, or preferably over almost the entirety of, at least some of the soft magnetic alloy grains P1, and insulation property of the first magnetic layer 121 is ensured by this first oxide F1. The adjacent soft magnetic alloy grains P1 are bonded together primarily via the first oxide F1 present around each soft magnetic alloy grain P1, and a magnetic body having a certain shape is constituted as a result. The adjacent soft magnetic alloy grains P1 may be partially bonded together at their respective metal parts. It should be noted that, whether the adjacent soft magnetic alloy grains P1 are bonded via the first oxide F1 or at their respective metal parts, preferably the magnetic body contains virtually no matrix of organic resin.

The individual soft magnetic alloy grains P1 are an alloy that contains at least iron (Fe) and two types of elements (elements L and M) that oxidize more easily than iron. Element L is different from element M, and both are a metal element or Si. If elements L and M are each a metal element, typically it is Cr (chromium), Al (aluminum), Zr (zirconium), Ti (titanium), etc., or preferably Cr or Al, and preferably Si or Zr is contained further.

The content of Fe in the entire magnetic body (first magnetic layer 121) is preferably 92.5 to 96 percent by weight. When the content of Fe is within the aforementioned range, high volume resistivity is ensured. The content of element L in the entire magnetic body is preferably 2.5 to 6 percent by weight. The content of element M in the entire magnetic body is preferably 1.5 to 4.5 percent by weight. Elements that may be contained besides Fe and elements L and M include Mn (manganese), Co (cobalt), Ni (nickel), Cu (copper), P (phosphorus), S (sulfur), C (carbon), etc. The composition of the entire magnetic body can be calculated by analyzing a section of the magnetic body by plasma emission spectrometry, for example.

The first oxide F1 is typically constituted by an oxide film of three-layer structure that includes a first oxide film F11, a second oxide film F12, and a third oxide film F13, in this order from the layer closest to the magnetic alloy grain P1 (i.e., inner side).

The first oxide film F11 is an oxide that contains more element L than element M. On the other hand, the second oxide film F12 is an oxide that contains more element M than element L. In this embodiment, element L is Si, and the first oxide film F11 is $SiO_2$. On the other hand, element M is Cr, and the second oxide film F12 is $Cr_2O_3$. The third oxide film F13 is an oxide that contains more Fe than element L or M ($Fe_xO_y$). This oxide of Fe is typically $Fe_3O_4$ which is a magnetic body, or $Fe_2O_3$ which is a non-magnetic body.

Element L contained in the first oxide film F11, and element M contained in the second oxide film F12, respectively correspond to Si and Cr, both of which are constituents of the soft magnetic alloy grain P1, that have diffused and separated. Similarly, Fe contained in the third oxide film F13 corresponds to Fe, which is a constituent of the soft magnetic alloy grain P1, that has diffused and separated.

As shown in FIG. 5, the first magnetic layer 121 has bonding parts V1 that bond the soft magnetic alloy grains P1 together. The bonding parts V1 are constituted by parts of the third oxide film F13, and allow multiple soft magnetic alloy grains P1 to bond to each other. The presence of the bonding parts V1 improves the mechanical strength and insulation property.

Preferably the first magnetic layer 121 is such that the adjacent soft magnetic alloy grains P1 are bonded together via the bonding parts V1 over its entirety; however, an area where the soft magnetic alloy grains P1 are bonded together without via the first oxide F1 may exist partially. In addition, the first magnetic layer 121 may partially include a mode where there is no bonding part V1 or other bonding part besides V1 (part where the soft magnetic alloy grains P1 are bonded together), and where the soft magnetic alloy grains P1 are simply in contact or close proximity with each other physically. In addition, the first magnetic layer 121 may partially have a void.

The first oxide F1 may be formed in the material grain stage before the magnetic body (first magnetic layer 121) is formed, or alternatively the first oxide F1 may be generated in the forming process, with the first oxide F1 kept non-existent or to an absolute minimum in the material grain stage. When the magnetic body is obtained by giving heat treatment to the soft material alloy grains P1 before being compacted, preferably the surface areas of the soft magnetic alloy grains P1 are oxidized to generate the first oxide F1 and the multiple soft magnetic alloy grains P1 bond together via the first oxide F1 thus generated.

In particular, since the first oxide film F11 is formed in a manner covering the entire surface of the soft magnetic alloy grain P1, preferably the content of element L is higher than that of element M across the magnetic body. Stable insulation property can be obtained because of the presence of the first oxide film F11. Also, it is estimated that adjusting the content of element M to a range of 1.5 to 4.5 percent by weight contributes to the capacity to reduce the thicknesses of the first and second oxide films while suppressing excessive oxidization.

(Second Magnetic Layer)

Figure 7:
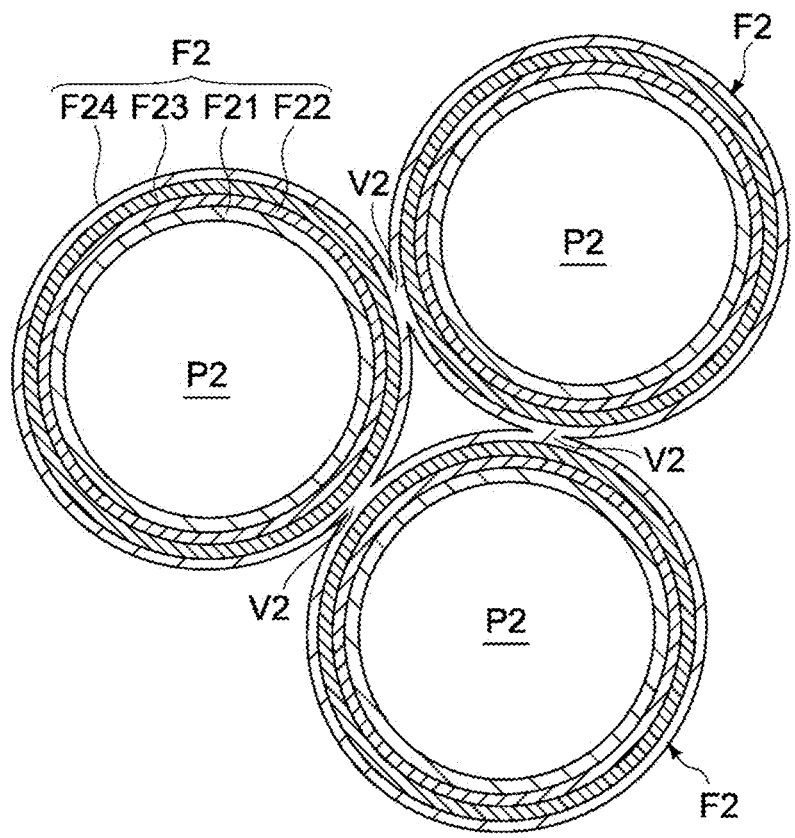
FIG. 7 is a cross-sectional view showing a schematic representation of the fine structure of the oxide films in the magnetic body constituting the second magnetic layer of the aforementioned coil component.
Figure 8:
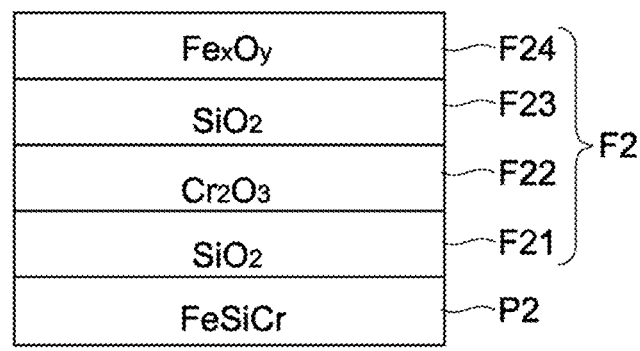
FIG. 8 is a cross-sectional view showing a schematic representation of the layer structure of the oxide films in the magnetic body constituting the aforementioned second magnetic layer.

On the other hand, FIG. 7 is an outline cross-sectional view of the second oxide F2 formed on the surfaces of the soft magnetic alloy grains P2 constituting the second magnetic layer 122, while FIG. 8 is a schematic view explaining the layer structure of this second oxide F2.

The second magnetic layer 122 is also constituted by an assembly of many soft magnetic alloy grains P2, or by a compacted powder comprising many soft magnetic alloy grains P2 bonded together. Depicted in FIG. 7 is an enlarged view of areas near the boundaries of three soft magnetic alloy grains P2.

The second oxide F2 is formed at least partially around, or preferably over almost the entirety of, at least some of the soft magnetic alloy grains P2, and insulation property of the second magnetic layer 122 is ensured by this second oxide F2. The adjacent soft magnetic alloy grains P2 are bonded together primarily via the second oxide F2 present around each soft magnetic alloy grain P2, and a magnetic body having a certain shape is constituted as a result. The adjacent soft magnetic alloy grains P2 may be partially bonded together at their respective metal parts; to achieve insulation property in a more reliable manner, however, preferably the magnetic body is formed by the adjacent soft magnetic alloy grains P2 bonded via the second oxide F2. It should be noted that, whether the adjacent soft magnetic alloy grains P2 are bonded via the second oxide F2 or at their respective metal parts, preferably the magnetic body contains virtually no matrix of organic resin.

The individual soft magnetic alloy grains P2 are an alloy that contains at least iron (Fe) and two types of elements (elements L and M) that oxidize more easily than iron. Element L is different from element M, and both are a metal element or Si. If elements L and M are each a metal element, typically it is Cr (chromium), Al (aluminum), Zr (zirconium), Ti (titanium), etc., or preferably Cr or Al, and preferably Si or Zr is contained further.

The content of Fe in the entire magnetic body (second magnetic layer 122) is preferably 92.5 to 96 percent by weight. When the content of Fe is within the aforementioned range, high volume resistivity is ensured. The content of element L in the entire magnetic body is preferably 2.5 to 6 percent by weight. The content of element M in the entire magnetic body is preferably 1.5 to 4.5 percent by weight. The composition of the entire magnetic body can be calculated by analyzing a section of the magnetic body by plasma emission spectrometry, for example.

Elements that may be contained besides Fe and elements L and M include Mn (manganese), Co (cobalt), Ni (nickel), Cu (copper), P (phosphorus), S (sulfur), C (carbon), etc.

The second oxide F2 is typically constituted by an oxide film of four-layer structure that includes a first oxide film F21 that covers the soft magnetic alloy grain P2, a second oxide film F22 that covers the first oxide film F21, a third oxide film F23 that covers the second oxide film F22, and a fourth oxide film F24 that covers the third oxide film F23.

The first oxide film F21 and third oxide film F23 are each an oxide that contains element L, typically an oxide that contains more element L than element M. On the other hand, the second oxide film F22 is an oxide that contains element M, typically an oxide that contains more element M than element L. In this embodiment, element L is Si, and the first and third oxide films F21, F23 are each $SiO_2$. On the other hand, element M is Cr, and the second oxide film F22 is $Cr_2O_3$. The fourth oxide film F24 is an oxide that contains more Fe than element L ($Fe_xO_y$) and also contains more Fe than does any of the first to third oxide films (as shown in Table 1, for example). This oxide of Fe is typically $Fe_3O_4$ which is a magnetic body, or $Fe_2O_3$ which is a non-magnetic body.

Element L contained in the first oxide film F21, and element M contained in the second oxide film F22, respectively correspond to Si and Cr, both of which are constituents of the soft magnetic alloy grain P2, that have diffused and separated. Similarly, Fe contained in the fourth oxide film F24 corresponds to Fe, which is a constituent of the soft magnetic alloy grain P2, that has diffused and separated. On the other hand, element L (Si) constituting the third oxide film F23 is constituted by the $SiO_2$ film that has been formed on the surface of the soft magnetic alloy grain P2 beforehand, as described below.

Presence of the second oxide F2 can be checked by composition mapping using a scanning electron microscope (SEM) at magnifications of approx. 5000 times. Presence of the first to fourth oxide films F21 to F24 constituting the second oxide F2 can be checked by composition mapping using a transmission electron microscope (TEM) at magnifications of approx. 20000 times. The thicknesses of the first to fourth oxide films F21 to F24 can be checked using a TEM energy-dispersive X-ray spectrometer (EDS) at magnifications of approx. 800000 times.

Insulation property of the entire magnetic body is warranted by the presence of the second oxide F2. In particular, the second oxide F2, which contains more oxide film (third oxide film F23) than the aforementioned first oxide F1, can achieve insulation characteristics higher than those of the first oxide F1.

As shown in FIG. 7, the second magnetic layer 122 has bonding parts V2 that bond the soft magnetic alloy grains P2 together. The bonding parts V2 are constituted by parts of the fourth oxide film F24, and allow multiple soft magnetic alloy grains P2 to bond with each other. Presence of the bonding parts V2 can be visibly checked on a SEM observation image that has been enlarged to approx. 5000 times, for example. The presence of the bonding parts V2 improves the mechanical strength and insulation property.

Preferably the second magnetic layer 122 is such that the adjacent soft magnetic alloy grains P2 are bonded together via the bonding parts V2 over its entirety; however, an area where the soft magnetic alloy grains P2 are directly bonded together by metal-to-metal bonding or metallic bonding without being intervened by via the second oxide F2 may exist partially. In addition, the second magnetic layer 122 may partially include a mode where there is no bonding part V2 or other boding part besides V2 (part where the soft magnetic alloy grains P2 are bonded together), and where the soft magnetic alloy grains P2 are simply in contact or close proximity with each other physically. In addition, the second magnetic layer 122 may partially have a void.

The second oxide F2 may be formed in the material grain stage before the magnetic body (second magnetic layer 122) is formed, or alternatively the second oxide F2 may be generated in the forming process, with the second oxide F2 kept non-existent or to an absolute minimum in the material grain stage.

In this embodiment, a pretreatment where the third oxide film F23 is formed on the surface of the soft magnetic alloy grain P2 is performed in the material grain stage before the magnetic body (second magnetic layer 122) is formed. Then, when the magnetic body (second magnetic layer 122) is obtained by giving heat treatment to the soft material alloy grains P2 before being compacted, the surface areas of the soft magnetic alloy grains P2 are oxidized to generate the first oxide film F21, second oxide film F22, fourth oxide film F24, and bonding parts V2.

How the pretreatment is performed to form the coating material which will constitute the third oxide film F23 on the surface of the material grain, is not limited in any way, and in this embodiment, a coating process using the sol-gel method is used. Typically, a treatment solution containing TEOS (tetraethoxy silane, $Si(OC_2H_5)_4$), ethanol and water is mixed into a mixed solution containing soft magnetic alloy grains P2, ethanol and ammonium water, and after the solutions are mixed and agitated, the soft magnetic alloy grains P2 are filtered out and separated and then dried, to produce soft magnetic alloy grains P2 having a coating material constituted by a $SiO_2$ film formed on their surface.

In the above, if the treatment solution is mixed into the mixed solution all at once, uniform nucleation becomes dominant, causing the $SiO_2$ grains to form nuclei and grow and eventually form aggregates in the solution, and as these aggregates attach to the surfaces of the soft magnetic alloy grains P2, the coating material cannot be formed stably. In this embodiment, therefore, the treatment solution is dripped and mixed into the mixed solution over multiple sessions, so that uniform nucleation of the $SiO_2$ grains is suppressed, while their non-uniform nucleation becomes dominant instead, on the surfaces of the soft magnetic alloy grains P2, which allows the coating material to be formed stably on the surfaces of the soft magnetic alloy grains P2.

The thickness of the third oxide film F23 (coating material) can be adjusted by the amount of TEOS contained in the treatment solution, and the greater the amount of TEOS, the thicker the obtained film becomes. The thickness of the third oxide film F23 is not limited in any way, but preferably it is 1 nm or more but no more than 20 nm. If the thickness is less than 1 nm, the coverage by the third oxide film F23 becomes poor and consequently improving the insulation characteristics becomes difficult. If the thickness exceeds 20 nm, on the other hand, the magnetic characteristics tend to drop due to a drop in the filling rate of the soft magnetic alloy grains P2.

Also, the thickness of the third oxide film F23 may be equal to or greater than the thickness of the first oxide film F21, or it may be smaller than the thickness of the first oxide film F21. By setting the thickness of the third oxide film F23 equal to or greater than the thickness of the first oxide film F21, the insulation characteristics can be effectively increased compared to when there is no third oxide film F23. By setting the thickness of the third oxide film F23 smaller than the thickness of the first oxide film F21, on the other hand, any drop in the magnetic characteristics (specific magnetic permeability, etc.) due to the presence of the third oxide film F23 can be suppressed.

In particular, since the first oxide film F21 is formed in a manner covering the entire surface of the soft magnetic alloy grain P2, preferably the content of element L is higher than that of element M across the entire magnetic body. Stable insulation property can be obtained because of the presence of the first oxide film F21. Also, adjusting the content of element M to a range of 1.5 to 4.5 percent by weight reduces the thicknesses of the first and second oxide films F21, F22 while suppressing excessive oxidization. Also, it should be noted that the first, second, third, and fourth oxide films F21 to F24 obtained here are amorphous, amorphous, amorphous, and crystalline in nature, respectively. As films of different properties are formed alternately, the resulting oxide films provide both insulation property and oxidization suppression effect, and as the films do not have greater-than-necessary thicknesses, the obtained magnetic body has high specific magnetic permeability while also offering insulation property.

(Third Magnetic Layer)

The magnetic material constituting the third magnetic layer 123 may be constituted in the same manner as with the first magnetic layer 121, or it may be constituted in the same manner as with the second magnetic layer 122. Typically, the third magnetic layer 123 is constituted by a magnetic material having magnetic characteristics equivalent to or better than those of the first magnetic layer 121.

[Method for Manufacturing Coil Component]

Figure 9A:
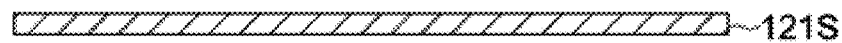
FIG. 9A to 9C are outline cross-sectional views of key parts, explaining how the magnetic body layers of the aforementioned coil component are manufactured.
Figure 9B:
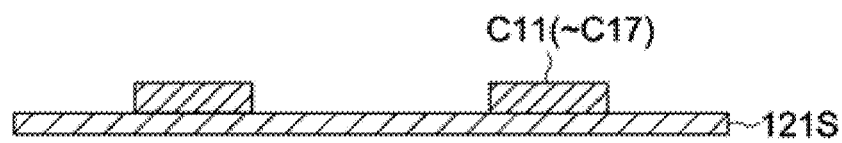
Figure 9C:
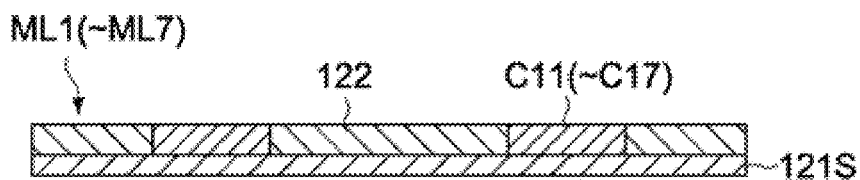

Next, how the coil component 10 is manufactured is explained. FIGS. 9A to 9C are outline cross-sectional views of key parts, explaining how the magnetic body layers ML1 to ML7 of the coil component 10 are manufactured.

The method for manufacturing the magnetic body layers ML1 to ML7 includes a step to produce the first magnetic layer 121, a step to form the conductive pattern C10, and a step to produce the second magnetic layer 122.

(Production of First Magnetic Layer)

For the production of the first magnetic layer 121, a magnetic body paste (slurry) that has been prepared beforehand, is coated on the surfaces of plastic base films (not illustrated) using a doctor blade, die-coater or other coating machine (not illustrated). Next, these base films are dried under the condition of approx. 80° C. for approx. 5 minutes, using a hot-air dryer or other dryer (not illustrated), to produce first to seventh magnetic sheets 121S corresponding to the magnetic body layers ML1 to ML7, respectively (refer to FIG. 9A). These magnetic sheets 121S are each formed to a size that allows multiple first magnetic layers 121 to be taken.

The composition of the magnetic body paste used here is 75 to 85 percent by weight of FeCrSi alloy grains (soft magnetic alloy grains P1), 13 to 21.7 percent by weight of butyl carbitol (solvent), and 2 to 3.3 percent by weight of polyvinyl butyral (binder), and adjusted by the average grain size (median diameter) of FeCrSi alloy grains. For example, the ratios are 85 percent by weight, 13 percent by weight, and 2 percent by weight, respectively, when the average grain size (median diameter) of FeCrSi alloy grains is 3 µm or more; 80 percent by weight, 17.3 percent by weight, and 2.7 percent by weight, respectively, when the average grain size of FeCrSi alloy grains is 1.5 µm or more but less than 3 µm; and 75 percent by weight, 21.7 percent by weight, and 3.3 percent by weight, respectively, when the average grain size of FeCrSi alloy grains is less than 1.5 µm. The average grain size of FeCrSi alloy grains is selected according to the thickness of the first magnetic layer 121, etc. The FeCrSi alloy grains are manufactured by the atomization method, for example.

The first magnetic layer 121 is produced with a thickness that allows at least four magnetic alloy grains (FeCrSi alloy grains) to lie side by side in the thickness direction, and this thickness is 5 µm or more but no more than 25 µm, for example. In this embodiment, the average volume-based grain size of magnetic alloy grains is preferably 1 to 4 µm based on d50 (median diameter). The d50 of the magnetic alloy grains is measured using a grain size/granularity distribution measurement machine that uses the laser diffraction/scattering method (such as Microtrac manufactured by Nikkiso).

Next, through holes (not illustrated) corresponding to the vias V1 to V6 (refer to FIG. 3) are formed in specified layouts in the first to sixth magnetic sheets 121S corresponding to the magnetic body layers ML1 to ML6, using a stamping machine, laser processing machine, or other boring machine (not illustrated). The layout of through holes is set so that when the first to seventh magnetic sheets 121S are stacked, internal conductors are formed by the through holes that have been filled with a conductor and also by the conductive patterns C11 to C17.

(Formation of Conductive Patterns)

Next, the conductive patterns C11 to C17 are formed on the first to seventh magnetic sheets 121S, as shown in FIG. 9B.

For the conductive pattern C11, a conductive paste that has been prepared beforehand, is printed on the surface of the first magnetic sheet 121S corresponding to the magnetic body layer ML1, using a screen printer, gravure printer, or other printing machine (not illustrated). Furthermore, when the conductive pattern C11 is formed, the aforementioned conductive paste is filled in the through hole corresponding to the via V1. Then, a hot-air dryer or other dryer (not illustrated) is used to dry the first magnetic sheet 121S under the condition of approx. 80° C. for approx. 5 minutes, to produce a first printed layer of specified layout that corresponds to the conductive pattern C11.

The conductive patterns C12 to C17 and vias V2 to V6 are also produced in a manner similar to the one described above. This way, second to seventh printed layers of specified layouts that correspond to the conductive patterns C12 to C17, are produced on the surfaces of the second to seventh magnetic sheets 121S corresponding to the magnetic body layers ML2 to ML7.

The composition of the conductive paste used here is 85 percent by weight of Ag grains, 13 percent by weight of butyl carbitol (solvent), and 2 percent by weight of polyvinyl butyral (binder), and the d50 (median diameter) of Ag grains is approx. 5 µm.

(Production of Second Magnetic Layer)

Next, the second magnetic layer 122 is formed on the first to seventh magnetic sheets 121S, as shown in FIG. 9C.

For the production of the second magnetic layer 122, the soft magnetic alloy grains P2 on whose surface the coating material (third oxide film F23) constituted by a silica film has been formed by the aforementioned pretreatment, are prepared first. Then, the magnetic body paste (slurry) that contains the FeCrSi alloy grains constituted by these soft magnetic alloy grains is coated around the conductive patterns C11 to C17 on the first to seventh magnetic sheets 121S, using a screen printer, gravure printer, or other printing machine (not illustrated). Next, this magnetic body paste is dried under the condition of approx. 80° C. for approx. 5 minutes using a hot-air dryer or other dryer (not illustrated).

The composition of the magnetic body paste used here is 85 percent by weight of FeCrSi alloy grains, 13 percent by weight of butyl carbitol (solvent), and 2 percent by weight of polyvinyl butyral (binder).

The thickness of the second magnetic layer 122 is adjusted to the same as, or to a difference of within 20% from, the thickness of the conductive patterns C11 to C17, and because each magnetic layer is formed roughly as an identical plane in the stacking direction and thus generates no height difference, a magnetic body part 12 free from stacking deviation, etc., is obtained. The second magnetic layer 122 is produced with a thickness that allows at least three magnetic alloy grains (FeCrSi alloy grains) to lie side by side in the thickness direction, and this thickness is 4 µm or more but no more than 20 µm, for example. The average grain size of the soft magnetic alloy grains P2 constituting the second magnetic layer 122 may be the same as or larger or smaller than the average grain size of the soft magnetic alloy grains P1 constituting the first magnetic layer 121. In this embodiment, the average grain size is 1 to 4 µm. The smaller the average grain size of the soft magnetic alloy grains P2, the larger the specific surface area becomes and therefore the higher the effect of insulating the soft magnetic alloy grains P2 with the second oxide F2 becomes.

The first to seventh sheets corresponding to the magnetic body layers ML1 to ML7 are thus produced (refer to FIG. 9C).

(Production of Third Magnetic Layer)

For the production of the third magnetic layer 123, a magnetic body paste (slurry) that has been prepared beforehand, is coated on the surfaces of plastic base films (not illustrated) using a doctor blade, die-coater, or other coating machine (not illustrated). Next, these base films are dried under the condition of approx. 80° C. for approx. 5 minutes, using a hot-air dryer or other dryer (not illustrated), to produce magnetic sheets corresponding to the third magnetic layers 123 that will constitute the magnetic body layers MLU, MLD. These magnetic sheets are each formed to a size that allows multiple third magnetic layers 123 to be taken.

The composition of the magnetic body paste used here is 85 percent by weight of FeCrSi alloy grains, 13 percent by weight of butyl carbitol (solvent), and 2 percent by weight of polyvinyl butyral (binder).

As described above, the third magnetic layer 123 is set according to the number of layers, so that the thicknesses of the magnetic body layers MLU, MLD become 50 µm or more but no more than 120 µm, for example. In this embodiment, the average grain size of the magnetic alloy grains constituting the third magnetic layer 123 may be the same as or larger or smaller than the average grain size of the magnetic alloy grains constituting the first magnetic layer 121 and the average grain size of the magnetic alloy grains constituting the second magnetic layer 122. If the average grain size is the same, the specific magnetic permeability can be increased; if the average grain size is smaller, on the other hand, the third magnetic layer 123 can be made thinner.

(Stacking and Cutting)

Next, the first to seventh sheets (corresponding to the magnetic body layers ML1 to ML7) and eighth sheet (corresponding to the magnetic body layers MLU, MLD) are stacked in the order shown in FIG. 3 and then thermally compressed, using a pickup transfer machine and a press machine (both are not illustrated), to produce a laminate.

Next, the laminate is cut to component body sizes using a dicing machine, laser processing machine, or other cutting machine (not illustrated), to produce pre-processing chips (each including a magnetic body part and a coil part, both before heat treatment).

(Degreasing and Formation of Oxides)

Next, many such pre-heat treatment chips are heat-treated together in air or other oxidizing ambience using a sintering furnace or other heat treatment machine (not illustrated). This heat treatment includes a degreasing process and an oxide formation process, with the degreasing process implemented under the condition of approx. 500° C. for approx. 1 hour, and the oxide formation process implemented under the condition of approx. 700° C. for approx. 5 hours.

Before the degreasing process is implemented, the pre-heat treatment chip has many fine gaps between the FeSiCr alloy grains inside the magnetic body before heat treatment, and the binder and the like are present in these fine gaps. However, the binder and the like are decomposed and vaporized in the degreasing process and these fine gaps turn into pores (voids) by the time the degreasing process is completed. Also, many fine gaps exist between the Ag grains inside the coil part before heat treatment, and the binder and the like are present in these fine gaps; however, they are decomposed and vaporized in the degreasing process.

In the oxide formation process following the degreasing process, the FeSiCr alloy grains inside the magnetic body before heat treatment come close together to produce the magnetic body part 12 (refer to FIGS. 1, 2), while at the same time the oxides (first oxide F1 and second oxide F2) of these grains are formed on the surfaces of the individual FeSiCr alloy grains. Also, the Ag grains inside the coil part before heat treatment are sintered, to produce the coil part 13 (refer to FIGS. 1, 2), and the component body 11 is produced as a result.

Here, with respect to the first magnetic layer 121, the first oxide F1 containing the first to third oxide films F11 to F13 is formed on the surfaces of the soft magnetic alloy grains P1, and the soft magnetic alloy grains P1 are bonded together via the bonding parts V1 (refer to FIG. 5). With respect to the second magnetic layer 122, on the other hand, the second oxide F2 containing the first to fourth oxide films F21 to F24 is formed on the surfaces of the soft magnetic alloy grains P2, and the soft magnetic alloy grains P2 are bonded together via the bonding parts V2 (refer to FIG. 7).

(Formation of External Electrodes)

Next, a conductive paste that has been prepared beforehand, is coated on both length-direction ends of the component body 11 using a dip-coater, roller-coater or other coating machine (not illustrated), and then heated under the condition of approx. 650° C. for approx. 20 minutes using a sintering oven or other heat treatment machine (not illustrated), thereby causing the solvent and binder to be vaporized and the Ag grains to be sintered through this heat treatment, to produce the external electrodes 14, 15 (refer to FIGS. 1, 2).

The composition of the conductive paste used here for the external electrodes 14, 15 is 85 percent by weight or more of Ag grains, where glass, butyl carbitol (solvent), and polyvinyl butyral (binder) are contained besides the Ag grains and the d50 (median diameter) of the Ag grains is approx. 5 µm.

Lastly, plating is performed. Plating is performed in the form of general electroplating, whereby a Ni—Sn metal film is deposited on the external electrodes 14, 15 that have been formed earlier as a result of the sintering of the Ag grains. The coil component 10 is thus obtained.

With the coil component 10 in this embodiment, the magnetic material constituting the second magnetic layer 122 has the soft magnetic alloy grains P2 and the second oxide F2 formed on their surfaces. In the magnetic material, the surfaces of the soft magnetic alloy grains P2 are covered with the first to fourth oxide films F21 to F24, and therefore insulation characteristics higher than those of the magnetic material constituting the first magnetic layer 121 can be obtained. This improves the insulation characteristics of the coil component 10 and allows it to support higher current with ease.

Furthermore, the second magnetic layer 122 achieves higher insulation characteristics than the first magnetic layer 121, and therefore good insulation characteristics are ensured even when the distance between the soft magnetic alloy grains P2 becomes shorter. Accordingly, desired insulation characteristics can be ensured in a stable manner even when an additional treatment to increase the compacted powder density (relative density of the second magnetic layer 122) of the magnetic material is implemented to improve the magnetic characteristics of the magnetic material.

As discussed above, in some embodiments, the bonding parts are constituted by parts of the fourth oxide film, and bond the multiple soft magnetic alloy grains together ("bonding" refers to securely joining more than contacting, by atomic and molecular level integration to create, e.g., a single phase). In some embodiments, alternatively, the multiple soft magnetic alloy grains coated with the oxide films can be prepared without forming magnetic layers, and can be used to form a core around which a coil is wound. In some embodiments, the multiple soft magnetic alloy grains coated with the oxide films are bonded together via resin without using the bonding parts by the fourth oxide film or other oxide film(s). For example, before compacting the grains, the grains are heat-treated at about 500° C., for example, and then, the heat-treated grains are bonded together via resin in a compacting process without forming bonding of the grains via the oxide film(s).

EXAMPLE

Examples of the present invention are explained below.

Example 1

Into a mixed solution containing soft magnetic alloy grains (FeSiCr alloy grains) of 6 μm in average grain size (D50) and specified amounts of ethanol and ammonium water, a treatment solution containing specified amounts of TEOS (tetraethoxy silane, $Si(OC_2H_5)_4$), ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a $SiO_2$ film of 15 nm in thickness had been formed. Compacted powders (magnetic bodies) of these soft magnetic alloy grains were produced, and their specific magnetic permeability (μ), volume resistivity [Ω·cm], dielectric breakdown voltage (BVD) [MV/cm], and strength [kgf/mm$^2$] were evaluated.

The compacted powder was produced under the conditions described below.

100 parts by weight of alloy grains were mixed under agitation with 1.5 parts by weight of PVA binder, to which 0.5 parts by weight of zinc stearate was added as lubricant. Thereafter, the mixture was formed into shapes for each of the evaluations described below, at a forming pressure of 6 to 18 tons/cm$^2$. Here, the forming pressure was adjusted so that the filling rate of the soft magnetic alloy grains in the magnetic body became 80 percent by volume. Next, the obtained compacted powder was degreased under the condition of 500° C. for 1 hour, and then heat-treated in an atmospheric ambience (oxidizing ambience) at 700° C. for 5 hours, to obtain a magnetic body.

To measure the specific magnetic permeability (μ), a toroidal magnetic body of 8 mm in outer diameter, 4 mm in inner diameter and 1.3 mm in thickness, was manufactured. Around this magnetic body, a coil constituted by a urethan-covered copper wire of 0.3 mm in diameter was turned 20 times, to obtain a measurement sample. The specific magnetic permeability of the magnetic body was measured using a LCRL meter (4285A manufactured by Agilent Technologies) at a measurement frequency of 10 MHz.

The volume resistivity was measured according to JIS-K6911. As a measurement sample, a disk-shaped magnetic body of 07.0 mm in outer diameter×0.5 to 0.8 mm in thickness was manufactured. Following the heat treatment described above, an Au film was formed on both faces of the disk shape (over the entire surfaces of the faces) by means of sputtering. Voltage of 3.6 V (60 V/cm) was applied to both sides of the Au films. The resulting resistance values were used to calculate the volume resistivity.

To measure the dielectric breakdown voltage, a disk-shaped magnetic body of 07.0 mm in outer diameter×0.5 to 0.8 mm in thickness was manufactured as a measurement sample. Following the heat treatment described above, an Au film was formed on both faces of the disk shape (over the entire surfaces of the faces) by means of sputtering. Voltage was applied to both sides of the Au films to measure I-V. The applied voltage was gradually increased, and when the current density reached 0.01 A/cm$^2$, the corresponding applied voltage was deemed to represent the breakdown voltage.

Figure 10:
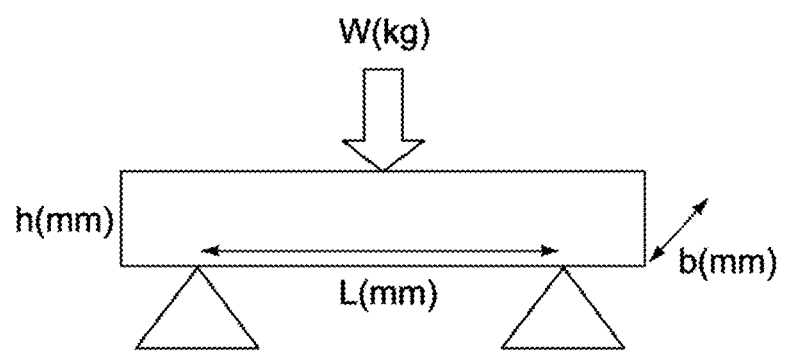
FIG. 10 is a schematic view explaining how the 3-point bending fracture stress is measured.

The 3-point bending fracture stress was measured to evaluate mechanical strength. FIG. 10 is a schematic view explaining the measurement of 3-point bending fracture stress. Load was applied to the measurement target as shown in the figure, to measure the load W that caused the measurement target to fracture. In consideration of the bending moment M and the second moment of area I, the 3-point bending fracture stress σb was calculated using the formula below:

$$\sigma b = (M/I) \times (h/2) = 3WL/2bh^2$$

wherein L is length, h is thickness, and b is width of the target (see FIG. 10).

For the test piece used to measure the 3-point bending fracture stress, a sheet-shaped magnetic body of 50 mm in length, 10 mm in width and 4 mm in thickness was manufactured as a measurement sample.

The components and thicknesses of the oxide films (corresponding to the first to fourth oxide films F21 to F24 in FIG. 7) that had been formed on the surfaces of the alloy grains in the magnetic body, were measured. For the measurement, a STEM (scanning tunneling electron microscope) carrying an EDS (energy-dispersive X-ray spectrometer) was used to check the component of each oxide film according to the STEM-EDS method, and the thickness of each oxide film was measured according to the STEM-HAADF (high angle annular dark field) method. Immediately before the measurement, a focused ion beam (FIB) instrument was used to create a thin sample of 50 to 100 nm, and the component of each oxide film was measured according to the EDS line analysis method, while the thickness of each oxide film was measured according to the HAADF method, in a range of 0.2 to 1.5 nm in electron beam diameter. As for the location where the thickness of each oxide film was measured, a part of an alloy grain not bonded with other alloy grains was selected, and a vertical line was drawn to the surface of the alloy grain. Next, on this vertical line, on the outer side of the surface of the alloy grain, the part where the oxygen abundance was 5% or less was considered the surface of the alloy grain. Furthermore, on the outer side of the surface of the alloy grain, the range where the amount of element L (Si, Zr, Hf, or Ti) was larger than that of element M (Cr or Al) was used as the thickness of the oxide film of element L (first oxide film). Then, by moving further toward the outer side, the range where the amount of element M was larger than that of element L was used as the thickness of the oxide film of element M (second oxide film), and the range where the amount of element L was larger than that of element M was used as the thickness of the oxide film of element L (third oxide film). Furthermore, the oxide film of Fe (fourth oxide film) was identified in the range where the amount of Fe was larger than that of element L.

The measured results are shown in Tables 1 and 2. The specific magnetic permeability was 27, volume resistivity was $2.7 \times 10^3$ [Ω·cm], dielectric breakdown voltage was $1.3 \times 10^{-2}$ [MV/cm], and strength was 10 [kgf/mm$^2$]. Also, the thickness of the first oxide film was 5 nm (component: Si), thickness of the second oxide film was 11 nm (component: Cr), thickness of the third oxide film was 15 nm (component: Si), and thickness of the fourth oxide film was 20 nm (component: Fe).

Example 2

Into a mixed solution containing soft magnetic alloy grains (FeSiCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 10 minutes, after which the solutions were mixed and agitated and the soft magnetic alloy grains were filtered out, separated, and dried, to produce soft magnetic alloy grains on whose surface a coating layer constituted by a SiO$_2$ film of 1 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 36, volume resistivity was $7.1 \times 10^1$ [Ω·cm], dielectric breakdown voltage was $5.3 \times 10^{-3}$ [MV/cm], and strength was 14 [kgf/mm$^2$]. Also, the thickness of the first oxide film was 5 nm (component: Si), thickness of the second oxide film was 11 nm (component: Cr), thickness of the third oxide film was 1 nm (component: Si), and thickness of the fourth oxide film was 60 nm (component: Fe).

Example 3

Into a mixed solution containing soft magnetic alloy grains (FeSiCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 15 minutes, after which the solutions were mixed and agitated and the soft magnetic alloy grains were filtered out, separated, and dried, to produce soft magnetic alloy grains on whose surface a coating layer constituted by a SiO$_2$ film of 5 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 34, volume resistivity was $3.2 \times 10^2$ [Ω·cm], dielectric breakdown voltage was $7.8 \times 10^{-3}$ [MV/cm], and strength was 12 [kgf/mm$^2$]. Also, the thickness of the first oxide film was 5 nm (component: Si), thickness of the second oxide film was 11 nm (component: Cr), thickness of the third oxide film was 5 nm (component: Si), and thickness of the fourth oxide film was 40 nm (component: Fe).

Example 4

Into a mixed solution containing soft magnetic alloy grains (FeSiCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 20 minutes, after which the solutions were mixed and agitated and the soft magnetic alloy grains were filtered out, separated, and dried, to produce soft magnetic alloy grains on whose surface a coating layer constituted by a SiO$_2$ film of 11 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 30, volume resistivity was $3.2 \times 10^2$ [Ω·cm], dielectric breakdown voltage was $7.8 \times 10^{-3}$ [MV/cm], and strength was 11 [kgf/mm$^2$]. Also, the thickness of the first oxide film was 5 nm (component: Si), thickness of the second oxide film was 11 nm (component: Cr), thickness of the third oxide film was 11 nm (component: Si), and thickness of the fourth oxide film was 30 nm (component: Fe).

Example 5

Into a mixed solution containing soft magnetic alloy grains (FeSiCr alloy grains) of 6 μm in average grain size (D50) and specified amounts of ethanol and ammonium water, a treatment solution containing specified amounts of tetra-i-propoxy zirconium Zr(O-i-C$_3$H$_7$)$_4$, ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a ZrO$_2$ film of 15 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 27, volume resistivity was $2.5 \times 10^3$ [Ω·cm], dielectric breakdown voltage was $1.1 \times 10^{-2}$ [MV/cm], and strength was 10 [kgf/mm$^2$]. Also, the thickness of the first oxide film was 5 nm (component:

Si), thickness of the second oxide film was 11 nm (component: Cr), thickness of the third oxide film was 15 nm (component: Zr), and thickness of the fourth oxide film was 20 nm (component: Fe).

Example 6

Into a mixed solution containing soft magnetic alloy grains (FeSiCr alloy grains) of 6 μm in average grain size (D50) and specified amounts of ethanol and ammonium water, a treatment solution containing specified amounts of tetra-i-propoxy hafnium Hf[OCH(CH$_3$)$_2$]$_4$, ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a HfO$_2$ film of 15 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 26, volume resistivity was 2.4×10$^3$ [Ω·cm], dielectric breakdown voltage was 1.2×10$^{-2}$ [MV/cm], and strength was 10 [kgf/mm$^2$]. Also, the thickness of the first oxide film was 5 nm (component: Si), thickness of the second oxide film was 11 nm (component: Cr), thickness of the third oxide film was 15 nm (component: Hf), and thickness of the fourth oxide film was 20 nm (component: Fe).

Example 7

Into a mixed solution containing soft magnetic alloy grains (FeSiCr alloy grains) of 6 μm in average grain size (D50) and specified amounts of ethanol and ammonium water, a treatment solution containing specified amounts of tetra-i-propoxy titanium Ti[OCH(CH$_3$)$_2$]$_4$, ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a TiO$_2$ film of 15 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 27, volume resistivity was 2.5×10$^3$ [Ω·cm], dielectric breakdown voltage was 1.1×10$^{-2}$ [MV/cm], and strength was 10 [kgf/mm$^2$]. Also, the thickness of the first oxide film was 5 nm (component: Si), thickness of the second oxide film was 11 nm (component: Cr), thickness of the third oxide film was 15 nm (component: Ti), and thickness of the fourth oxide film was 20 nm (component: Fe).

Example 8

Into a mixed solution containing soft magnetic alloy grains (FeSiAl alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a SiO$_2$ film of 15 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 25, volume resistivity was 3.0×10$^3$ [Ω·cm], dielectric breakdown voltage was 1.1×10$^{-2}$ [MV/cm], and strength was 11 [kgf/mm$^2$]. Also, the thickness of the first oxide film was 5 nm (component: Si), thickness of the second oxide film was 15 nm (component: Al), thickness of the third oxide film was 15 nm (component: Si), and thickness of the fourth oxide film was 20 nm (component: Fe).

Example 9

Into a mixed solution containing soft magnetic alloy grains (FeZrCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 50 minutes, after which the solutions were mixed and agitated and the soft magnetic alloy grains were filtered out, separated, and dried, to produce soft magnetic alloy grains on whose surface a coating layer constituted by a SiO$_2$ film of 15 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 27, volume resistivity was 2.0×10$^3$ [Ω·cm], dielectric breakdown voltage was 1.1×10$^{-2}$ [MV/cm], and strength was 10 [kgf/mm$^2$]. Also, the thickness of the first oxide film was 5 nm (component: Zr), thickness of the second oxide film was 11 nm (component: Cr), thickness of the third oxide film was 15 nm (component: Si), and thickness of the fourth oxide film was 20 nm (component: Fe).

Example 10

Into a mixed solution containing soft magnetic alloy grains (FeZrCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 70 minutes, after which the solutions were mixed and agitated and the soft magnetic alloy grains were filtered out, separated, and dried, to produce soft magnetic alloy grains on whose surface a coating layer constituted by a SiO$_2$ film of 20 nm in thickness had been formed. Compacted powders (magnetic bodies) of these soft magnetic alloy grains were produced under the same conditions as in Example 1, and their specific magnetic permeability (μ), volume resistivity

[Ω·cm], dielectric breakdown voltage (BVD) [MV/cm], and strength [kgf/mm$^2$] were evaluated.

The measured results are shown in Tables 1 and 2. The specific magnetic permeability was 25, volume resistivity was $4.1\times10^3$ [Ω·cm], dielectric breakdown voltage was $1.1\times10^{-2}$ [MV/cm], and strength was 10 [kgf/mm$^2$]. Also, the thickness of the first oxide film was 5 nm (component: Si), thickness of the second oxide film was 11 nm (component: Cr), thickness of the third oxide film was 20 nm (component: Si), and thickness of the fourth oxide film was 20 nm (component: Fe).

Example 11

Into a mixed solution containing soft magnetic alloy grains (FeZrCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 90 minutes, after which the solutions were mixed and agitated and the soft magnetic alloy grains were filtered out, separated, and dried, to produce soft magnetic alloy grains on whose surface a coating layer constituted by a SiO$_2$ film of 24 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was, 21 volume resistivity was $5.0\times10^3$ [Ω·cm], dielectric breakdown voltage was $8.0\times10^{-3}$ [MV/cm], and strength was 8 [kgf/mm$^2$]. Also, the thickness of the first oxide film was 5 nm (component: Si), thickness of the second oxide film was 11 nm (component: Cr), thickness of the third oxide film was 24 nm (component: Si), and thickness of the fourth oxide film was 15 nm (component: Fe).

Example 12

Into a mixed solution containing soft magnetic alloy grains (FeSiCr alloy grains) of 2 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 10 minutes, after which the solutions were mixed and agitated and the soft magnetic alloy grains were filtered out, separated, and dried, to produce soft magnetic alloy grains on whose surface a coating layer constituted by a SiO$_2$ film of 1 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 21, volume resistivity was $8.0\times10^{-2}$ [Ω·cm], dielectric breakdown voltage was $6.6\times10^{-3}$ [MV/cm], and strength was 12 [kgf/mm$^2$]. Also, the thickness of the first oxide film was 5 nm (component: Si), thickness of the second oxide film was 11 nm (component: Cr), thickness of the third oxide film was 1 nm (component: Si), and thickness of the fourth oxide film was 60 nm (component: Fe).

Example 13

Into a mixed solution containing soft magnetic alloy grains (FeSiCr alloy grains) of 1 μm in average grain size (D50) and specified amounts of ethanol and ammonium water, a treatment solution containing specified amounts of TEOS (tetraethoxy silane, Si(OC$_2$H$_5$)$_4$), ethanol, and water was dripped by equal amounts over a period of 10 minutes, after which the solutions were mixed and agitated and the soft magnetic alloy grains were filtered out, separated, and dried, to produce soft magnetic alloy grains on whose surface a coating layer constituted by a SiO$_2$ film of 1 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 10, volume resistivity was $1.0\times10^2$ [Ω·cm], dielectric breakdown voltage was $1.2\times10^{-2}$ [MV/cm], and strength was 13 [kgf/mm$^2$]. Also, the thickness of the first oxide film was 5 nm (component: Si), thickness of the second oxide film was 11 nm (component: Cr), thickness of the third oxide film was 1 nm (component: Si), and thickness of the fourth oxide film was 60 nm (component: Fe).

Comparison Example

Into a mixed solution containing soft magnetic alloy grains (FeSiCr alloy grains) of 6 μm in average grain size (D50) and specified amounts of ethanol and ammonium water, a treatment solution containing specified amounts of TEOS (tetraethoxy silane, Si(OC$_2$H$_5$)$_4$), ethanol, and water was mixed all at once and agitated, after which the soft magnetic alloy grains were filtered out, separated, and dried, to produce soft magnetic alloy grains on whose surface a coating layer constituted by a SiO$_2$ film of 30 nm in thickness had been formed. Compacted powders (magnetic bodies) of these soft magnetic alloy grains were produced under the same conditions as in Example 1, and their specific magnetic permeability (μ), volume resistivity [Ω·cm], dielectric breakdown voltage (BVD) [MV/cm], and strength [kgf/mm$^2$] were evaluated.

The measured results are shown in Tables 1 and 2. The specific magnetic permeability was 20, volume resistivity was $1.1\times10^1$ [Ω·cm], dielectric breakdown voltage was $7.0\times10^{-4}$ [MV/cm], and strength was 7 [kgf/mm$^2$]. Also, the thickness of the first oxide film was 5 nm (component: Si), thickness of the second oxide film was 11 nm (component: Cr), and thickness of the third oxide film was 71 nm and its component was primarily Fe with Si and Cr mixed in. The fourth oxide film could not be confirmed.

TABLE 1

| | Material powder | | Magnetic body | | | | | | | |
|---|---|---|---|---|---|---|---|---|---|---|
| | Alloy grain Grain size [μm] | Coating material Thickness [nm] | First oxide film Component | Thickness [nm] | Second oxide film Component | Thickness [nm] | Third oxide film Component | Thickness [nm] | Fourth oxide film Component | Thickness [nm] |
| Comparative Example | FeSicr 6 | $SiO_2$ 30 | Si | 5 | Cr | 11 | Fe, Others | 71 | — | — |
| Example 1 | FeSiCr 6 | $SiO_2$ 15 | Si | 5 | Cr | 11 | Si | 15 | Fe | 20 |
| Example 2 | FeSiCr 6 | $SiO_2$ 1 | Si | 5 | Cr | 11 | Si | 1 | Fe | 60 |
| Example 3 | FeSiCr 6 | $SiO_2$ 5 | Si | 5 | Cr | 11 | Si | 5 | Fe | 40 |
| Example 4 | FeSiCr 6 | $SiO_2$ 11 | Si | 5 | Cr | 11 | Si | 11 | Fe | 30 |
| Example 5 | FeSiCr 6 | $ZrO_2$ 15 | Si | 5 | Cr | 11 | Zr | 15 | Fe | 20 |
| Example 6 | FeSiCr 6 | $HfO_2$ 15 | Si | 5 | Cr | 11 | Hf | 15 | Fe | 20 |
| Example 7 | FeZrCr 6 | $TiO_2$ 15 | Si | 5 | Cr | 11 | Ti | 15 | Fe | 20 |
| Example 8 | FeSiAl 6 | $SiO_2$ 15 | Si | 5 | Al | 15 | Si | 15 | Fe | 20 |
| Example 9 | FeZrCr 6 | $SiO_2$ 15 | Zr | 5 | Cr | 11 | Si | 15 | Fe | 20 |
| Example 10 | FeSiCr 6 | $SiO_2$ 20 | Si | 5 | Cr | 11 | Si | 20 | Fe | 20 |
| Example 11 | FeSiCr 6 | $SiO_2$ 24 | Si | 5 | Cr | 11 | Si | 24 | Fe | 15 |
| Example 12 | FeSiCr 2 | $SiO_2$ 1 | Si | 5 | Cr | 11 | Si | 1 | Fe | 60 |
| Example 13 | FeSiCr 1 | $SiO_2$ 1 | Si | 5 | Cr | 11 | Si | 1 | Fe | 60 |

TABLE 2

| | Specific magnetic permeability μ (at 10 MHz) | Volume resistivity [Ω · cm] | BDV [MV/cm] | Strength [kgf/mm$^2$] |
|---|---|---|---|---|
| Comparative Example | 20 | $1.1 \times 10^1$ | $7.0 \times 10^{-4}$ | 7 |
| Example 1 | 27 | $2.7 \times 10^3$ | $1.3 \times 10^{-2}$ | 10 |
| Example 2 | 36 | $7.1 \times 10^1$ | $5.3 \times 10^{-3}$ | 14 |
| Example 3 | 34 | $3.2 \times 10^2$ | $7.8 \times 10^{-3}$ | 12 |
| Example 4 | 30 | $3.2 \times 10^2$ | $7.8 \times 10^{-3}$ | 11 |
| Example 5 | 27 | $2.5 \times 10^3$ | $1.1 \times 10^{-2}$ | 10 |
| Example 6 | 26 | $2.4 \times 10^3$ | $1.2 \times 10^{-2}$ | 10 |
| Example 7 | 27 | $2.5 \times 10^3$ | $1.1 \times 10^{-2}$ | 10 |
| Example 8 | 25 | $3.0 \times 10^3$ | $1.1 \times 10^{-2}$ | 11 |
| Example 9 | 27 | $2.0 \times 10^3$ | $1.1 \times 10^{-2}$ | 10 |
| Example 10 | 25 | $4.1 \times 10^3$ | $1.1 \times 10^{-2}$ | 10 |
| Example 11 | 21 | $5.0 \times 10^3$ | $8.0 \times 10^{-3}$ | 8 |
| Example 12 | 21 | $8.0 \times 10^1$ | $6.6 \times 10^{-3}$ | 12 |
| Example 13 | 10 | $1.0 \times 10^2$ | $1.2 \times 10^{-2}$ | 13 |

As shown in Tables 1 and 2, higher dielectric breakdown characteristics and higher specific magnetic permeabilities were obtained according to Examples 1 to 11 where the coating material was formed by dripping the treatment solutions by a specified amount at a time into the solution of alloy grains, than those in the Comparative Example where the coating material was formed by mixing the treatment solution into the aforementioned solution all at once. This is probably because the third oxide film (coating material) was formed uniformly on the surface of the alloy powder and, although the thickness of the oxide film was small, there were virtually no defects. In addition, probably the presence of both the first oxide film and third oxide film also contributed to the dielectric breakdown characteristics and helped reduce the overall thickness of the first through fourth oxide films.

In the above, when Example 1 and the Comparative Example are compared, they both used a mixed solution containing ethanol, ammonium water, TEOS, and water in the pretreatment to form a coating layer constituted by a Si oxide film on the alloy grains. However, how this mixed solution was prepared led to significantly different results in terms of the mode of the $SiO_2$ film formed on the alloy grain surface.

In other words, under the treatment method in the Comparative Example, where the alloy grains, ethanol, ammonium water, TEOS, and water were mixed all at once, uniform nucleation becomes dominant, causing the $SiO_2$ grains to form nuclei and grow and eventually form aggregates in the solution, with these aggregates attaching to the surfaces of the soft magnetic alloy grains, as described above. As a result, the fine $SiO_2$ grains could not cover the entire alloy grains, and instead attached to their surfaces partially, and consequently the dielectric breakdown characteristics of the soft magnetic alloy grains could not be improved.

Figure 11:
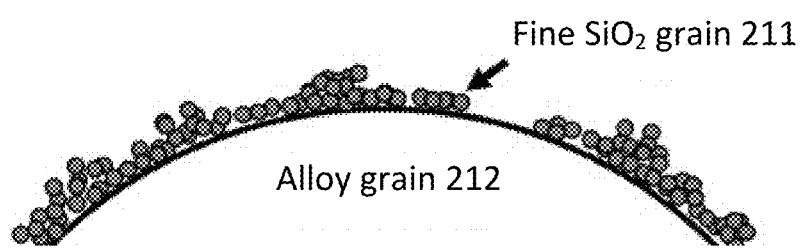
FIG. 11 is a grain cross-sectional view showing a schematic representation of the state of the fine $SiO_2$ grains formed on the surface of a soft magnetic alloy grain in the Comparative Example.

FIG. 11 is a grain cross-sectional view showing a schematic representation of the state of the fine $SiO_2$ grains formed on the surface of a soft magnetic alloy grain in the Comparative Example where the alloy grains, ethanol, ammonium water, TEOS, and water were mixed all at once. It should be noted that, when fine $SiO_2$ grains 211 were formed on a surface of each alloy grain 212 by adjusting the mixed solution as described above, the $SiO2_2$ grains obtained by the uniform nucleation and grain growth exhibited an interference pattern that looked like fringes, for example, when observed under a high-resolution TEM at magnifications of approx. 50000 times. This interference pattern corresponded to a crystalline lattice fringe, and the fact that such pattern was observed indicates that the aggregates obtained by the treatment method in the Comparative Example were crystalline in nature.

Figure 12:
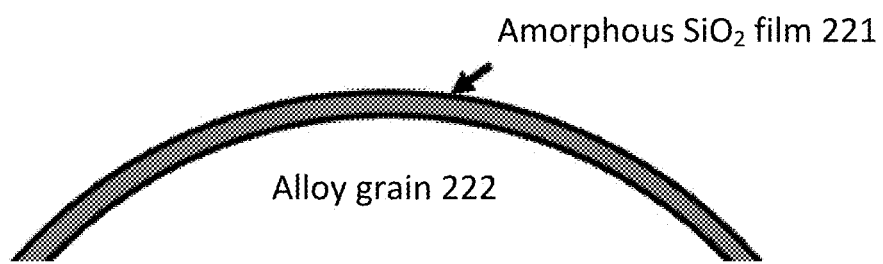
FIG. 12 is a grain cross-sectional view showing a schematic representation of the state of the coating layer formed on the surface of a soft magnetic alloy grain in Example 1.

On the other hand, the treatment method in Example 1, where the treatment solution containing TEOS, ethanol and water was dripped and mixed into the mixed solution containing the alloy grains, ethanol, and ammonium water over multiple sessions, suppressed uniform nucleation, while instead making non-uniform nucleation become dominant on the surfaces of the alloy grains and therefore the coating layer on the alloy grain surface was formed with a stably uniform thickness, although the thickness was less than 25 nm. By using this method, the coating film thickness can be controlled in the single nano-order based on the input amount of TEOS, and the coating film can be formed in a stable manner even when the thickness is 1 nm, for example. FIG. 12 is a grain cross-sectional view showing a schematic representation of the state of the coating layer, where the coating layer (amorphous $SiO_2$ film 221) was formed on a soft magnetic alloy grain 222 according to Example 1. Also, when the coating layer formed in Example 1 was observed under a high-resolution TEM at magnifications of approx.

50000 times, an interference pattern looking like fringes, for example, could not be observed. The fact that such interference pattern was not observed indicates that the coating layer in Example 1 was amorphous in nature. In general, the insulation resistance value of an amorphous $SiO_2$ is two to three digits higher than the resistance value of a crystalline $SiO_2$. This means that, even when the $SiO_2$ film (the coating layer) coated in Example 1 has a thickness of 1 nm (still covering substantially or approximately the entire surface of each grain), for example, dielectric breakdown characteristics higher than those in the Comparative Example can still be achieved. The thickness of the coating layer can be as small as about 1 nm while maintaining high insulation resistance although it may have small pinholes; however, preferably, substantially no pinholes are present in the coating layer since a pinhole can be a point of dielectric breakdown In addition, because the thicknesses of the coating layers in Examples 1 to 11 are small, or 24 nm or less to be specific, the iron (Fe) diffuses to the outer side of the coating layer from the alloy grains because of the heat treatment, and the fourth oxide film is formed in a stable manner as a result. This improves the insulation characteristics further.

As described above, how the oxide films are formed in the pretreatment is significantly different between Example 1 and the Comparative Example, and therefore the film properties of the obtained oxide films are significantly different. These differences in the film properties of the oxide films manifest as the differences in the dielectric breakdown characteristics and strength of the compacted powder after heat treatment.

According to the aforementioned evaluations, Example 1 achieved higher specific magnetic permeability than Example 8. This is likely due to the fact that Al oxidizes more easily than Cr, which slightly affected the filling rate after heat treatment. Preferably, element M is Cr, as higher specific magnetic permeability can be achieved. Also, Example 1 achieved higher dielectric breakdown characteristics than Examples 5 and 6. This is likely due to the fact that, given the same thickness, a Si oxide film is more uniform and has fewer defects compared to a Zr or Hf film.

Particularly regarding the thicknesses of the first to fourth oxide films, the insulation property can be increased further when the thicknesses are arranged in the order of magnitude of "First<Third<Fourth" (Examples 1 and 4 to 9). The specific magnetic permeability can be increased further when the size of the soft magnetic alloy grain is the same and "Third≤First<Fourth" is also satisfied (Examples 2 and 3). The fourth oxide film fills the voids generated when the binder is degreased, so increasing the thickness of this film does not lower the specific magnetic permeability significantly; on the contrary, the void-filling action increases the strength and also reduces the permeation of water, etc., from the outside, thereby leading to improved reliability. In addition, the first and second oxide films in Examples 5, 6, and 7 are clearly constituted only by the components of the soft magnetic alloy grain, indicating that each oxide film is independently formed.

Also, in Example 11, the specific magnetic permeability dropped further than in Example 10, to a level slightly higher than in the Comparative Example. This is likely due to the excessive formation of the third oxide film. It should also be noted that, in none of these examples is the thickness of the third oxide film smaller than 1 nm. A film that covers the surface of the soft magnetic alloy grain cannot be formed if its thickness is less than 1 nm. The oxide of element L that forms the third oxide film is expected to have a size, as an oxide, of 0.5 nm or more, which means that, for oxides of this size to be arranged continuously, the oxide film must be 1 nm or thicker. For this reason, preferably the third oxide film is 1 nm or more but no more than 20 nm thick.

In Examples 12 and 13, 2-µm and 1-µm alloy grains are used, respectively, compared to Example 2 where the thickness of the third oxide film is the same but 6-µm alloy grains are used. Smaller alloy grains mean lower specific magnetic permeabilities, but due to the treatment method similar to Example 2, a coat of uniform thickness is formed in a stable manner regardless of the alloy grain size, as shown in FIG. 12, and dielectric breakdown characteristics can be increased. On the other hand, the treatment method in the Comparative Example, where the alloy grains, ethanol, ammonium water, TEOS, and water are mixed all at once, ensures dielectric breakdown characteristics by causing the $SiO_2$ grain aggregates to attach to the alloy grain surface; if the grain size difference between the alloy grain and the $SiO_2$ grain becomes smaller, however, it becomes difficult to densely cover the alloy grain surface, and the dielectric breakdown characteristics do not improve.

In addition, it was confirmed that insulation characteristics similar to those of a FeSiCr magnetic body can also be achieved by a magnetic body of FeSiAl or FeZrCr. Moreover, it was confirmed that insulation characteristics similar to those of a magnetic body having a coating material whose component is Si can also be achieved when the component of the coating material is Zr, Hf, or Ti.

The foregoing explained an embodiment of the present invention; however, the present invention is not limited to the aforementioned embodiment, and it goes without saying that various modifications can be added.

For example, while the above embodiment explained an example where the magnetic material pertaining to the present invention was applied only to the second magnetic layer 122, the present invention is not limited to the foregoing and it can also be applied to the first magnetic layer 121, third magnetic layer 123, or at least two of the first, second and third magnetic layers.

Also, in the explanation of the above embodiment, a magnetic body constituting the magnetic core of a coil component or multilayer inductor was used as an example of the magnetic material; however, the present invention is not limited to the foregoing and it can also be applied to a magnetic body used in a motor, actuator, generator, reactor, choke coil, or other electromagnetic component.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-129672, filed Jun. 30, 2016, and No. 2017-100746, filed May 22, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A magnetic material, comprising:
multiple soft magnetic alloy grains that contain Fe, element L (where element L is Si, Zr, or Ti), and element M (where element M is not Si, Zr, or Ti, and oxidizes more easily than Fe);
a first oxide film that contains element L and covers each of the multiple soft magnetic alloy grains;
a second oxide film that contains element M and covers the first oxide film;
a third oxide film that contains element L, covers the second oxide film, and is amorphous in nature; and
a fourth oxide film that contains Fe and covers the third oxide film; and
bonding parts that are constituted by parts of the fourth oxide film and that bond the multiple soft magnetic alloy grains together.

2. A magnetic material according to claim 1, wherein element M is Cr.

3. A magnetic material according to claim 1, wherein element L is Si.

4. A magnetic material according to claim 1, wherein the third oxide film has a thickness equal to or greater than a thickness of the first oxide film.

5. A magnetic material according to claim 1, wherein the third oxide film has a thickness of 1 nm or more but no more than 20 nm.

6. A magnetic material according to claim 1, wherein the first oxide film contains more element L than element M, the second oxide film contains more element M than element L, the third oxide film contains more element L than element M and is amorphous, and the fourth oxide film contains more Fe than element L and also contains more Fe than does any of the first to third oxide films.

7. A magnetic material according to claim 1, wherein each of the multiple soft magnetic alloy grains is covered with a coating layer as the first oxide film, said coating layer being constituted by amorphous silicon oxide and covering substantially an entire surface of each grain.

8. A magnetic material according to claim 7, wherein the coating layer has a thickness of 1 nm or more and less than 25 nm.

9. A magnetic material comprising:
multiple soft magnetic alloy grains that contain Fe, element L (where element L is Si, Zr, or Ti), and element M (where element M is not Si, Zr, or Ti, and oxidizes more easily than Fe);
a first oxide film that contains element L and covers each of the multiple soft magnetic alloy grains;
a second oxide film that contains element M and covers the first oxide film;
a third oxide film that contains element L, covers the second oxide film, and is amorphous in nature; and
a fourth oxide film that contains Fe and covers the third oxide film.

10. An electronic component having a magnetic core that contains a magnetic material according to claim 1.

11. An electronic component having a magnetic core that contains a magnetic material according to claim 2.

12. An electronic component having a magnetic core that contains a magnetic material according to claim 3.

13. An electronic component having a magnetic core that contains a magnetic material according to claim 4.

14. An electronic component having a magnetic core that contains a magnetic material according to claim 5.

15. An electronic component having a magnetic core that contains a magnetic material according to claim 6.

16. An electronic component having a magnetic core that contains a magnetic material according to claim 7.

17. An electronic component having a magnetic core that contains a magnetic material according to claim 8.

18. An electronic component having a magnetic core that contains a magnetic material according to claim 9.

* * * * *